Patented Jan. 10, 1950

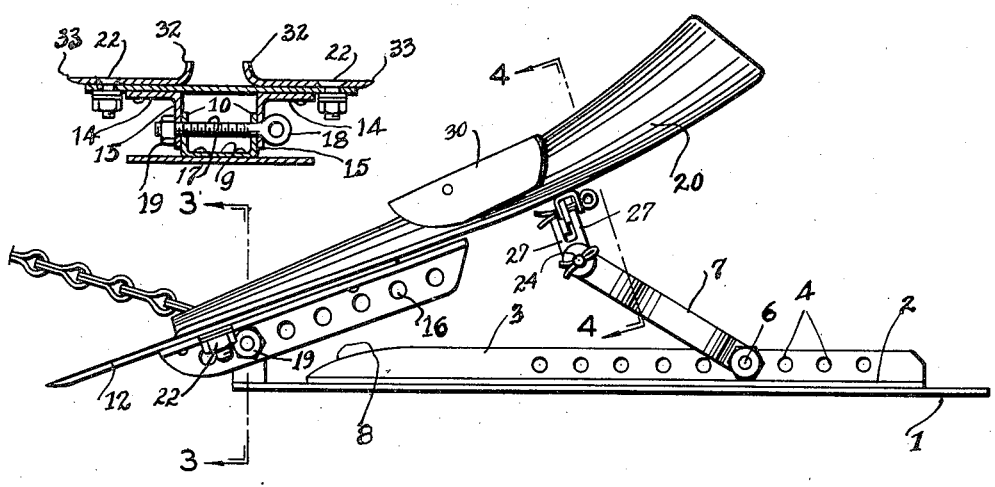
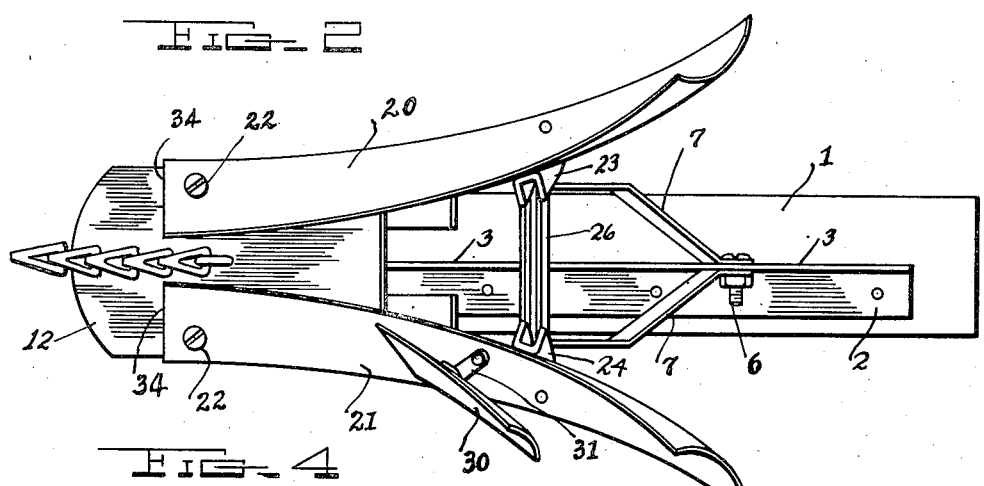

2,494,263

UNITED STATES PATENT OFFICE 2,494,263

VEGETATION CUTTER

Clark L. Roberts, Nampa, Idaho

Application December 14, 1945, Serial No. 635,070

6 Claims. (Cl. 37—171)

This invention relates to improvements in an apparatus for cutting vegetation from the walls of irrigation ditches.

All irrigated land is dependent upon a system of ditches which by means of gates controls the flow of water in predetermined regulated quantities. It will be obvious to one skilled in the art that these ditches will rapidly propagate a growth of weeds and other vegetation which consumes quantities of the water and also impedes its passage so that regulation is difficult if not impossible to accurately gauge.

It is therefore the primary purpose of this invention to construct an apparatus which is capable of quick adjustment for cutting and removing weeds and other growth from the bottom and sides of irrigation ditches of any size.

A further object of this invention is to construct an apparatus for the purpose specified capable of accurate adjustment for performing the many operations essential in the construction and maintenance of irrigation ditches of all types and sizes.

More specifially this invention includes a landslide which supports the structure and travels over the bottom of the ditch, a cutting front member or nose shaped to properly function in cutting the growth and other matter with which it comes in contact, mould boards for clearing the ditch sides and means for adjusting the various parts with respect to each other and discharging laterally the matter removed from the ditch.

Other objects will more clearly hereinafter appear by reference to the accompanying drawings forming a part of this specification and wherein like characters of reference designate corresponding parts throughout the several views, in which—

Figure 1 is a side elevation of the apparatus;

Fig. 2 is a top plan view;

Fig. 3 is a section on line 3—3 of Fig. 1; and

Fig. 4 is a fragmentary elevation of a portion of the mould board adjusting means.

Referring now to the drawings, reference character 1 indicates a landslide preferably formed by a relatively long flat steel plate of suitable thickness to stand substantial wear, and of a length and width to support on an even keel the entire operating structure. As shown, this landslide 1 extends well behind the superstructure. Extending longitudinally and medially of the upper face of the landslide is the angle iron having base flange 2 and vertical flange 3. This base flange 2 is relatively wide to lend maximum essential rigidity to the landslide and the vertical flange 3 is formed with a plurality of openings 4 for receiving the fastening bolts 6 which adjustably secure the lower ends of the angular arms 7. The forward end 8 of the upright flange 3 is tapered to reduce its height to permit an increased range of adjustment of the superstructure. The front end of the landslide 1 is provided with an upright support of U-shape, the base 9 of the support (Fig. 3) being of substantial width with respect to the landslide and extending transversely thereof at its front top end portion, while the spaced uprights or ears 10 at each end of the base 9 are formed with aligned openings as will hereinafter more clearly appear.

A bit or cutter 12 is spaced above and extends forwardly of the landslide. This bit or cutter 12 is of a width representing the maximum cut desired, although this element is removable and replaceable to permit the use of a different size or design cutter. To the underside of the bit 12 there are secured two spaced angle irons having base flanges 14 and outwardly projecting flanges 15. The base flanges 14 are secured to and extend longitudinally of the under face of the bit and are so spaced laterally that the projecting flanges 15 will be in outer contact and association with the spaced uprights or ears 10 of the support 9. The flanges 15 are formed with a plurality of diametrically spaced openings 16 and these openings 16 and the openings in the uprights 10 when in register permit the use of the screw fastener 17. This fastener 17 includes the eye head 18 and the adjusting nut 19 and by this means a bit can be adjusted longitudinally of the landslide to regulate the cut of the apparatus.

To the top of the cutter 12 and at each side thereof there are secured the elongated curved mould boards 20 and 21 each being pivoted to the cutter 12 at its forward end by pivot members 22. The pivot point may be such as to permit lateral adjustment of the front ends of the mould boards, this being advisable inasmuch as one of their primary functions is the cutting of weeds and the like from the side banks of a ditch and these ditches vary in width. To further compensate for lateral clearing of ditches the mould boards are provided for further adjustment at their rear support, by means of the curved channeled braces 23 and 24 which are secured to the curved under faces of the mould boards intermediate of their length and are each formed with a series of openings 25 to which the ends of the spacer bar 26 are connected. A U-shaped clamp plate having spaced clamping walls 27 and pintle opening for the hinge pin 29 is bolted to the spacer bar 26 and the lateral ends of the pin 29 form hinged connections for the upper ends of the angular supporting arms 7. These arms 7 have their upper ends offset laterally so that each of the mould boards is directly supported from the landslide for both vertical and longitudinal adjustment.

Supplemental wing members 30 may be secured by brackets 31 to each of the mould boards to clear the cuttings laterally to each side of the ditch. These wing members 30 can be adjusted on their brackets to meet any conditions or requirements and in some cases their use will be unnecessary as the mould boards themselves due to their inner flanged edges 32 and gradually curved surfaces inherently handle and discharge the cleared material. It will be noted from Figure 3 that the outer edges of the mould board 33 are formed as cutting edges and that the forward ends 34 are substantially flat to permit flush engagement with the bit 12 and pivoted movement with relation thereto. Extending rearwardly the mould boards have their inner edges curved outwardly to create a concave trough which flares outwardly in accordance with the adjustment of the rear mounting or support. The mould boards are distorted gradually throughout their length from horizontal to vertical, whereby the cuttings cleared by the apparatus are discharged to the ditch sides, unless the supplemental wings are utilized to facilitate movement and in the latter event the discharge may be made at a point inward of the normal discharge point of the mould boards.

What I claim is:

1. A device for cleaning ditches consisting of an elongated landslide having a longitudinally extending reinforcing member secured to its upper face, longitudinally spaced supports carried by the landslide, a cutting member, a pair of mould boards having their forward ends pivotally mounted on the cutter for pivotal movement with relation thereto and extending rearwardly and outwardly at each side of the landslide, transverse pivotal means connecting said cutter to the forward support for longitudinal adjustment with relation thereto, and link means for securing the rear portion of the mould boards to the rear support to permit vertical adjustment of said moldboards on said transverse pivot.

2. A ditch cleaner including a flat elongated landslide, an angle member extending longitudinally of the landslide and reinforcing the same, said angle member including a flange formed with a plurality of openings, a cutting member superimposed above and extending forwardly and laterally of the landslide and at an angle thereto, mould boards having flattened end portions pivoted to each side of the cutter permitting lateral adjustment of said mould boards, hinge means for supporting the cutter on the front end of the landslide, means permitting adjustment of the cutter longitudinally of said hinge to permit relative adjustment of the landslide and cutter, and link means supporting the rear portions of the mould boards on said flange.

3. The substance of claim 2, characterized in that the mould boards are formed with inner upwardly extending marginal flanges.

4. The substance of claim 2 characterized in that the mould boards are supported from the flange by hinged links.

5. The substance of claim 2 characterized in that the mould boards are formed with flattened front end portions lying flush with said cutter and concave rear outwardly facing portions.

6. In a ditch cleaner, a landslide having a longitudinally extending reinforcing element including a vertically extending centrally arranged flange, a cutter supported for angular and longitudinal adjustment at the front end of said landslide, a pair of spaced mould boards pivoted for lateral adjustment to the upper face of said cutter, means for spacing said mould boards in predetermined relation at their rear end, and means pivotally connected to said spacing means and adjustably connected to said flange for supporting said mould boards at their rear ends.

CLARK L. ROBERTS.

REFERENCES CITED

The following references are of record in the file of this patent:

UNITED STATES PATENTS

| Number | Name | Date |
| --- | --- | --- |
| 1,665,428 | Wagner | Apr. 10, 1928 |